(12) United States Patent
Vaz De Azevedo

(10) Patent No.: US 8,308,130 B2
(45) Date of Patent: Nov. 13, 2012

(54) VALVE INCORPORATING MEANS FOR BALANCING PRESSURES ON EITHER SIDE OF A VALVE MEMBER

(75) Inventor: José Vaz De Azevedo, Saint-Vincent (FR)

(73) Assignee: Valeo Systemes de Controle Moteur, Osny (FR)

( * ) Notice: Subject to any disclaimer, the term of this patent is extended or adjusted under 35 U.S.C. 154(b) by 908 days.

(21) Appl. No.: 11/667,348

(22) PCT Filed: Nov. 7, 2005

(86) PCT No.: PCT/FR2005/002767
§ 371 (c)(1),
(2), (4) Date: May 8, 2007

(87) PCT Pub. No.: WO2006/051204
PCT Pub. Date: May 18, 2006

(65) Prior Publication Data
US 2008/0116409 A1    May 22, 2008

(30) Foreign Application Priority Data
Nov. 9, 2004   (FR) ..................................... 04 11911

(51) Int. Cl.
*F16K 31/02* (2006.01)
(52) U.S. Cl. .............. 251/129.07; 251/129.17; 251/282; 251/331; 251/335.2
(58) Field of Classification Search ............. 251/129.07, 251/129.17, 282
See application file for complete search history.

(56) References Cited

U.S. PATENT DOCUMENTS

| | | | |
|---|---|---|---|
| 4,953,825 A | 9/1990 | Osumi et al. | |
| 5,108,067 A * | 4/1992 | Straub | 251/45 |
| 6,216,673 B1 | 4/2001 | Matsumoto | |
| 2002/0117644 A1 * | 8/2002 | Carrillo et al. | 251/129.08 |
| 2004/0113113 A1 | 6/2004 | Krimmer et al. | |

FOREIGN PATENT DOCUMENTS

EP    0 291 649 A2   11/1988

OTHER PUBLICATIONS

International Search Report for PCT/FR2005/002767 mailed Feb. 6, 2006 with English translation (4 pages).

* cited by examiner

*Primary Examiner* — John K Fristoe, Jr.
*Assistant Examiner* — Marina Tietjen
(74) *Attorney, Agent, or Firm* — Osha Liang LLP

(57) ABSTRACT

The disclosure relates to a valve comprising a body defining at least an admission duct and an outlet duct for a fluid and receiving a valve member that is movable by means of an actuator member fastened to the body to move between a closed position closing the outlet duct and an open position leaving it open, the valve member having a central portion secured to a central portion of a substantially plane diaphragm that has a peripheral portion associated in leaktight manner with a support element secured to the body in such a manner as to co-operate with the support element to define a chamber, the valve member and the diaphragm being pierced by an opening providing permanent communication between the chamber and the outlet duct, the diaphragm being elastically deformable and being dimensioned to urge the valve member into its closed position.

6 Claims, 1 Drawing Sheet

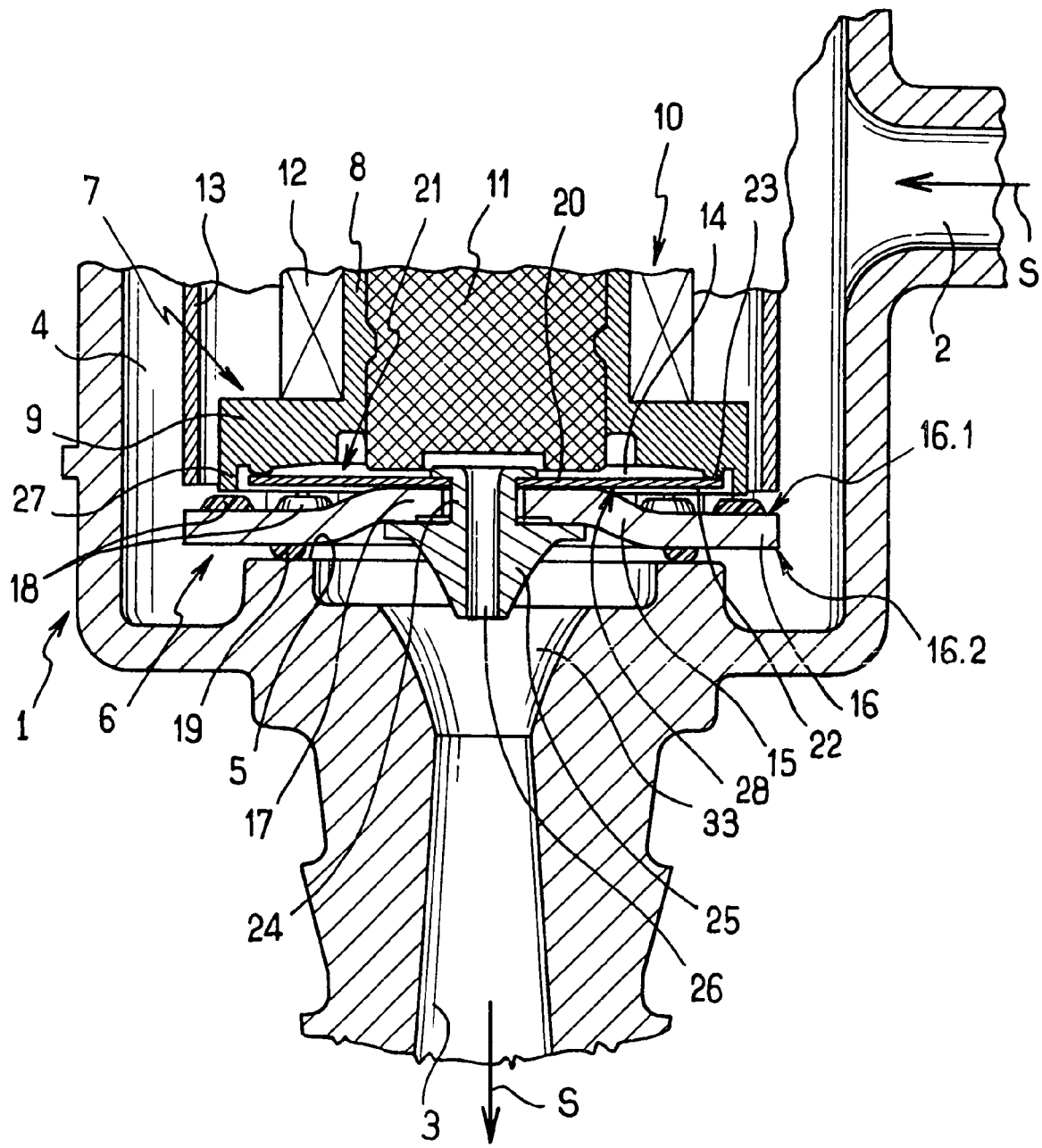

VALVE INCORPORATING MEANS FOR BALANCING PRESSURES ON EITHER SIDE OF A VALVE MEMBER

The present invention relates to a valve suitable for use in particular for controlling the flow rate of a fluid in a fluid transport circuit, such as the circuit feeding a motor vehicle engine with fuel, for example.

BACKGROUND OF THE INVENTION

Such a valve generally comprises a body defining an inlet duct and an outlet duct for a fluid and receiving a valve member that is movable between a closed position in which it closes the outlet duct and an open position in which it is spaced apart therefrom by means of an actuator member fastened to a support element secured to the body. By way of example, the actuator member is an electromagnetic actuator member associated with a spring for returning the valve member into its closed position.

When the valve member is in the closed position, the pressure acting on the valve member beside the inlet duct differs from the pressure acting on the valve member beside the outlet duct. The force that results from this pressure difference tends to hold the valve member in its closed position by adding to the return force exerted by the spring. To bring the valve member into its open position, the electromagnetic actuator member therefore needs to provide sufficient force to overcome the combined action of the spring and of the pressure difference. This requires an electromagnetic member that is dimensioned accordingly, thereby presenting relatively large size and relatively high levels of electricity consumption. In addition, the force that needs to be delivered is not constant and depends on the pressure difference that exists between the two faces of the valve member.

To mitigate that drawback, it is known to use flexible sleeves of elastomer material, each having one end closed by the valve member and an opposite end connected to the support element in such a manner as to form a chamber. The chamber communicates with the outlet duct via an opening formed through the valve member so that the same pressure exists both in the chamber and in the outlet duct. The valve member is returned to the closed position by a spring interposed in the sleeve between the valve member and the support element. As a result the valve has a relatively large number of parts, thereby lengthening the duration and the complexity of assembly. In addition, assembling the sleeve and the spring is quite difficult. Furthermore, given the shape of the sleeve and the deformation to which it is subjected, the sleeve is made of an elastomer, which presents only limited ability to withstand fuel, unless it is prohibitively expensive. The flexibility of the sleeve also makes it necessary to provide means for guiding the valve member.

OBJECT OF THE INVENTION

It would therefore be advantageous to have a valve of structure that is simpler than that of prior art valves, but without sacrificing effectiveness.

BRIEF SUMMARY OF THE INVENTION

To this end, the invention provides a valve comprising a body defining at least an admission duct and an outlet duct for a fluid and receiving a valve member that is movable by means of an actuator member fastened to the body to move between a closed position closing the outlet duct and an open position leaving it open, the valve member having a central portion secured to a central portion of a substantially plane diaphragm that has a peripheral portion associated in leak-tight manner with a support element secured to the body in such a manner as to co-operate with the support element to define a chamber, the valve member and the diaphragm being pierced by an opening providing permanent communication between the chamber and the outlet duct, the diaphragm being elastically deformable and being dimensioned to urge the valve member into its closed position.

Thus, the diaphragm co-operates with the support element to form a chamber at the same pressure as the outlet chamber, thus making it possible to limit the force that needs to be exerted on the valve member in order to bring it into its open position. The substantially plane shape of the diaphragm makes it possible for the valve to be compact in structure. In addition, the resilient return of the valve member into the closed position is provided by the diaphragm itself, so there is no need to add a spring dedicated to providing this effect. In order to perform these functions, the diaphragm is relatively stiff, thus also enabling it to guide the valve member. Another advantage of using a resilient return diaphragm lies in the fact that during movement of the valve member towards its open position, the force exerted by the diaphragm increases rapidly and tends to slow the valve member down as it arrives in the open position. This helps limit the noise made by the valve in operation. Such a diaphragm is made of materials that are relatively stiff, and in particular of metals that present relatively good ability to withstand fuel at lesser cost.

Other characteristics and advantages of the invention appear on reading the following description of a particular, non-limiting reservoir of the invention.

BRIEF DESCRIPTION OF THE DRAWING

Reference is made to the sole accompanying FIGURE which shows, in section, a portion of a valve in accordance with the invention.

DETAILED DESCRIPTION OF THE INVENTION

With reference to the FIGURE, the valve in accordance with the invention comprises a body given overall reference 1, defining an admission duct 2 and an outlet duct 3, each having one end that opens out into a housing 4 of the body 1. The outlet duct 3 is shaped to have a segment 33 that converges (relative to the fluid flow direction represented by arrows S) in the vicinity of said end. The end is surrounded in the housing 4 by a seat 5 against which there bears a valve member given overall reference 6 that is associated, in a manner described in greater detail below, with a support element given overall reference 7 that is secured to the body 1 so as to extend inside the housing 4 in line with the outlet duct 3.

The support element 7 has a tubular portion 8 with one end adjacent to the seat 5 that is terminated by a collar 9. The support element 7 is made of a non-magnetic material.

An electromagnetic actuator member 10 of known type is mounted on the support element 7. In conventional manner, the electromagnetic actuator 10 comprises a core 11 mounted in the tubular portion 8, and a coil 12 mounted on the tubular portion 8 and connected to electrical power supply means (not shown). Specifically, the core 11 is embedded in the support element 7, while the coil is made by winding a conductor directly onto the tubular portion 8. The electromagnetic actuator member 10 also comprises, in known manner, a field-closing bell 13. The core 11 has one end projecting from the tubular portion 8 into a chamber 14 that is formed in the collar 9 so as to be open to the outside of the collar 9 and so as to lead into the tubular portion 8.

The valve member 6 has a rigid strength member of magnetic steel, shaped as a disk with a domed center. The valve strength member 6 thus has an annular peripheral portion 16 that is plane with a projecting surface 16.1 from which there extends a circular central portion 17 that is plane and concentric with the peripheral portion 16. The peripheral portion 16 and the central portion 17 are connected to each other by a frustoconical portion 15.

Damper studs 18 of elastomer material project from the surface 16.1 of the peripheral portion 16. On its opposite side, the peripheral portion 16 possesses a projecting surface 16.2 from which there extends an annular sealing element 19, e.g. of elastomer material, for pressing against the seat 5. The damper studs 18 and the sealing element 19 in this example are hot-stuck onto the valve strength member 6.

The central portion 17 of the valve member has a convex surface pressed against the central portion 20 of a diaphragm given overall reference 21 made of a disk of relatively rigid material such as a metal such as stainless steel or a copper alloy, . . . .

The diaphragm 21 is substantially plane and has a peripheral portion 22 bearing in leaktight manner against an annular bearing surface 23 surrounding the chamber 14 in such a manner that the diaphragm 21 closes the chamber 14. The annular bearing surface 23 in this example is formed by a bead that provides a line bearing against the peripheral portion 22 of the diaphragm 21. The collar 9 possesses a rim 27 projecting from the annular bearing surface 23 to position the diaphragm 21 laterally.

The diaphragm 21 possesses a surface 28 facing the surface 16.1 of the valve member 6.

The central portions 20, 17 of the diaphragm 21 and of the valve strength member 6 are united in this example by a tubular rivet 24 defining a passage 26. The rivet 24 is received in a central opening of the diaphragm 21 and of the valve strength member 6, and serves to center the valve member 6 relative to the diaphragm 21. The rivet 24 presses the central portion 20 of the diaphragm 21 and the central portion 17 of the valve strength member 6 against each other.

The valve member 6 also has a central projection beside the outlet duct 3 presenting an outside surface that is complementary in shape to the shape of the converging segment 33. This projection is formed by one end 25 of the rivet 24.

The diaphragm 21 is elastically deformable between a rest state corresponding substantially to a position in which the valve is closed (as shown in the FIGURE), in which the valve member 6 presses against the seat 5, and a deformed state corresponding to an open position in which the valve member is separated from its seat 5.

When the valve is in its closed position, the diaphragm is lightly prestressed to press the valve member 6 against the seat 5. In addition, this prestress serves in particular to compensate for any low level of suction in the housing 4. The surface 16.1 of the peripheral portion 16 of the valve strength member 6 and the surface 28 of diaphragm 21 are subjected to the admission pressure, while the surfaces opposite thereto of the diaphragm 21 and of the valve member 6 are subjected to the pressure of the outlet duct 3. The fluid under pressure, in association with the prestress and the stiffness of the diaphragm 21, thus exerts both a force on the peripheral portion 20 of the diaphragm 21, which force tends to press the diaphragm against the annular bearing surface 23, and a force on the valve member 6, tending to press it against its seat 5. The area ratio of the surfaces 16.1 and 28 is designed in such a manner that the forces acting in opposite directions are equivalent. This makes it possible to achieve very good sealing both of the chamber and of the valve.

When the valve is in its closed position, the chamber 14 and the outlet duct 3 are at the same pressure, i.e. the pressure that exists in the outlet duct 3, because of the passage 26 that provides permanent communication between the chamber 14 and the outlet duct 3.

The valve member 6 is moved into its open position when the coil 12 is excited, thereby causing the diaphragm 21 to deform towards its deformed state. Since this deformation is substantially symmetrical, the valve member 6 is shifted parallel to itself. The portion extending between the peripheral portion 16 and the central portion 17 accommodate the major fraction of the deformation of the diaphragm 21 such that the contacting surfaces of the valve member 6 and of the diaphragm 21 remain unchanged during deformation of the diaphragm 21. Because of the rapid increase in the opposing force exerted by the diaphragm 21, the damper studs 18 come into contact with the support element 7 at a speed that is relatively slow. When the valve member 6 is in its open position, the damper studs 18 are in contact with the support element 7 that forms an abutment stopping the movement of the valve member 6.

In this position, the horn-shaped projection 25 guides the lines of fluid flow within the converging segment 33 of the outlet duct 3, thereby limiting fluid disturbances in this location and increasing the fluid flow rate while suction is relatively weak in the outlet duct 3.

When the coil 12 ceases to be excited, the diaphragm 21 returns to its rest state, thereby bringing the valve member 6 into the closed position. Because the chamber 14 is in communication with the opposite face of the valve member 6, the suction effect that occurs on the valve member 6 is limited, thus making it possible to achieve a relatively low level of noise when the valve member 6 comes to press against the seat 5.

Naturally, the invention is not restricted to the embodiment described and variant embodiments can be applied thereto without going beyond the ambit of the invention as defined by the claims.

In particular, the annular bearing surface may be plane and it is possible to interpose an annular sealing element between the annular bearing surface and the peripheral portion of the diaphragm. The outer edge of the peripheral portion of the diaphragm may be engaged in a groove in the support element, or it may be fastened thereto in a manner that does not hinder deformation of the diaphragm.

In addition, the diaphragm may be dimensioned so that the force needed for holding it in its deformed state is substantially equal to that exerted by the electromagnetic actuator member. It is then possible to omit any additional positive abutment for defining the open position of the valve member 6.

The actuator member may be mounted on the outside of the body 1, the support element then being formed, for example, by a portion of the body that serves only for bearing against the peripheral portion of the diaphragm.

A plastics material or a composite material may also be used for the diaphragm.

The diaphragm and the valve member may be connected together by fastener means other than a rivet, for example by adhesive or by welding.

The horn-shaped projection from the valve member may be made on a conventional valve member, e.g. being integral therewith.

The valve member may also be formed of a disk having its central portion surmounted by a cylinder.

What is claimed is:

1. A valve comprising:

a body defining at least an admission duct and an outlet duct for a fluid, wherein the body is configured to receive a valve member that is movable by means of an actuator member fastened to the body to move between a closed position closing the outlet duct and an open position allowing the outlet duct to remain open, wherein the valve member has a central portion secured to a central portion of a substantially plane diaphragm that has a peripheral portion bearing in a leaktight manner with a support element secured to the body, so as to co-operate with the support element to define a chamber, wherein the valve member and the diaphragm are pierced by an opening providing permanent communication between the chamber and the outlet duct, and wherein the diaphragm is elastically deformable and is prestressed when the valve member is in the closed position, wherein the prestress of the diaphragm itself exerts a force urging the valve member into its closed position independent of any pressure.

2. A valve according to claim 1, wherein the central portions are connected together by a tubular rivet.

3. A valve according to claim 1, wherein the outlet duct has a converging portion in the vicinity of a seat against which the valve member bears, wherein the seat is located at an end of the outlet duct that opens into the body, and wherein the valve member has a projection beside the outlet duct and presenting an outside surface of shape that is complementary to the converging section.

4. A valve according to claim 1, wherein the peripheral portion of the diaphragm bears simply against the support element, wherein the support element has a rim for laterally positioning the diaphragm, and wherein the diaphragm and the valve member have facing surfaces designed to be subjected to the pressure that exists in the admission duct.

5. A valve according to claim 4, wherein the valve member comprises a rigid strength member having a central portion that projects from a peripheral portion thereof, the central portion of the rigid strength member having a convex side secured to the central portion of the diaphragm with an annular sealing element being fastened on a side of the valve member that is opposite from the diaphragm.

6. A valve according to claim 5, wherein the actuator member is secured to the support element.

* * * * *